(12) United States Patent
Cremers et al.

(10) Patent No.: US 7,773,806 B2
(45) Date of Patent: Aug. 10, 2010

(54) EFFICIENT KERNEL DENSITY ESTIMATION OF SHAPE AND INTENSITY PRIORS FOR LEVEL SET SEGMENTATION

(75) Inventors: Daniel Cremers, Bonn (DE); Mikael Rousson, Trenton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1164 days.

(21) Appl. No.: 11/397,040

(22) Filed: Apr. 3, 2006

(65) Prior Publication Data

US 2007/0003137 A1 Jan. 4, 2007

Related U.S. Application Data

(60) Provisional application No. 60/672,649, filed on Apr. 19, 2005.

(51) Int. Cl.
*G06K 9/34* (2006.01)
*G06K 9/62* (2006.01)
(52) U.S. Cl. .................. 382/173; 382/164; 382/228
(58) Field of Classification Search ............... 382/164, 382/171, 173, 224, 228
See application file for complete search history.

(56) References Cited

U.S. PATENT DOCUMENTS

2005/0041102 A1* 2/2005 Bongiovanni et al. ....... 348/155
2005/0069176 A1* 3/2005 Toland ....................... 382/110

OTHER PUBLICATIONS

Paragios et al. ("Geodesic active region and level set methods for supervised texture segmentation," International Journal of Computer Vision 46(3), 2002, pp. 223-247).*
Bosnjak et a. ("Fusion of a prior model for the 3D segmentation of the left ventricle in echocardiographics images," IEEE Computer in Cardiology, Sep. 19-22, 2004, pp. 545-548).*
Suri et al. ("Shape recovery algorithms using level sets in a 2D/3D medical imagery: a state-of-the-art review," IEEE Transactions on Information Technology in Biomedicine, vol. 6, Issue 1, Mar. 2002, pp. 8-28).*
Cremers et al. ("Variational space-time motion segmentation," Proc. Int'l Conf. on Computer Vision, Oct. 13-16, 2003, vol. 2, pp. 886-893).*
Kim, et al., "A Nonparametric Statistical Method for Image Segmentation Using Information Theory and Curve Evolution," submitted to IEEE Transactions of Image Processing, Jul. 27, 2004.
Cremers et al, "Kernal Density Estimation and Intrinsic Alignment for Shape Priors in Level Set Segmentation," Kluwer Academic Publishers, 2006.
Rousson et al., "Implicit shape Models for 3D Segmentation in MR Imaging," *Lecture Notes in Computer Science*, vol. 3216, Springer Berlin/Heidenberg, 2004.

(Continued)

*Primary Examiner*—Yubin Hung
(74) *Attorney, Agent, or Firm*—Donald B. Paschburg (57) ABSTRACT

Methods and systems for image segmentation are disclosed. A nonlinear statistical shape model of an image is integrated with a non-parametric intensity model to estimate characteristics of an image and create segmentations of an image based on Bayesian inference from characteristics of prior learned images based on the same models.

20 Claims, 5 Drawing Sheets

OTHER PUBLICATIONS

Leventon et al, "Statistical Shape Influence in Geodesic Active Contours," Computer Vision and Pattern Recognition, Proceedings IEEE Conference, 2000.

Tsai et al, "A Shaped Based Approach to the Segmentation of Medical Imagery Using Level Sets," IEEE Transactions on Medical Imaging, Feb. 2003.

Cremers et al, "Kernal Density Estmination and Intrinsic Alginment for Knowledge-Driven Segmentation: Teaching Level Sets to Walk," C. Rasmussen (ed), *Pattern Recognition*, Sep. 2004.

Osher et al, "Fronts Propagating with Curvature Dependent Speed: Algorithms Based on Hamilton-Jacobi Formulations," Journal of Comutational Physics, 79, pp. 12-49 (1988).

Kim, Junmo et al., "Nonparametric Methods for Image Segmentation Using Information Theory and Curve Evolution", *Proceedings of the 2002 IEEE International Conference on Image Processing*, Rochester, NY Sep. 2002, 4 pages.

\* cited by examiner

3D view  Kernel/Uniform  Kernel/Gaussian  Kernel/Manual

EFFICIENT KERNEL DENSITY ESTIMATION OF SHAPE AND INTENSITY PRIORS FOR LEVEL SET SEGMENTATION

STATEMENT OF RELATED CASES

This application claims the benefit of U.S. Provisional Application No. 60/672,649, filed Apr. 19, 2005, which is incorporated herein by reference.

BACKGROUND OF THE INVENTION

This invention relates to systems and methods for processing digital images. More specifically it relates to image segmentation wherein an object of interest in an image is separated from the background of that object in the image.

Segmentation is a frequently encountered problem in image processing. It is particularly important in medical imaging where it is desired to extract an object, such as an organ or tumor, from an image for further processing.

There are many different segmentation processes available. The effectiveness of all of the segmentation processes vary in accordance with the quality of the image data, the application as well as a number of other factors.

Segmentation in medical image data is particularly difficult. The massive amounts of data make segmentation difficult in this area. Further, the quality of the image data obtained from medical imaging devices is not always optimal. Additionally, the quality of the segmentation is generally very important since the segmentation may be used to guide a diagnosis or a treatment plan.

Accordingly, new and improved methods and systems are required that will create segmentation of images and image volumes.

SUMMARY OF THE INVENTION

The present invention provides a method of segmenting an object in a set of image data using one or more prior instances of the object. In accordance with one aspect of the present invention, the steps include determining a nonparametric estimate of a property from the one or more prior instances of the object in a subspace spanned by the one or more prior instances of the object, imposing the nonparametric estimate of the one or more priors in a Bayesian expression conditioned on the set of image data and selecting a segmentation of the object in the set of image data by executing a level set method which optimizes the Bayesian expression.

The property can be an intensity. It can also be a shape. The property from the one or more prior instances of the object can be based on an average value of a property associated with each one of the prior instances of the object. The property from the one or more prior instances of the object can be based on a distance function. The expression can be an energy function The property from the one or more prior instances of the object can be translation and rotation invariant. The property from the one or more prior instances of the object can be based on a density function, such as the kernel density.

The expression can be:

$$E(\alpha, h, \theta) = -\int_{\Omega}(H_\phi \log p_{in}(I) + (1 - H_\phi)\log p_{out}(I))dx - \log\left(\frac{1}{N\sigma}\sum_{i=1}^{N}K\left(\frac{\alpha - \alpha_i}{\sigma}\right)\right).$$

It is one aspect of the present invention to provide efficient image segmentation methods using level set segmentation and imposing prior knowledge of the to be segmented image.

It is another aspect of the present invention to provide a statistical shape prior which combines the efficiency of low-dimensional PCA-based (principal component analysis-based) methods with the accuracy of nonparametric statistical shape models.

It is a further aspect of the present invention to provide estimation methods for the statistical properties of objects in images.

It is another aspect of the present invention to provide a distance function for the set level segmentation that is nonparametric.

It is a further aspect of the present invention to model the shape distribution of objects by the kernel density estimate.

It is another aspect of the present invention to provide methods of level set segmentation as Bayesian inference of learned priors.

It is another aspect of the present invention to provide a method to optimally use the intensity information in the image by using probabilistic intensity models given by kernel density estimates of previously observed intensity distributions of learned priors.

It is a further aspect of the present invention to provide a method for knowledge-driven level set segmentation by integrating several aspects of the present invention.

DESCRIPTION OF A PREFERRED EMBODIMENT

A level set process was originally proposed as a means to propagate interfaces in time. See, for example, A. Dervieux and F. Thomasset. A finite element method for the simulation of Raleigh-Taylor instability. *Springer Lect. Notes in Math.*, 771:145-158, 1979 and S. J. Osher and J. A. Sethian. Fronts propagation with curvature dependent speed: Algorithms based on Hamilton—Jacobi formulations. *J. of Comp. Phys.*, 79:12-49, 1988.

The level set method has become increasingly popular as a framework for image segmentation. The key idea is to represent an interface $\Gamma \subset \Omega$ in the image domain $\Omega \subset R^3$ implicitly as the zero level set of an embedding function $\phi: \Omega \to R$:

$$\Gamma = \{x \in \Omega | \phi(x) = 0\}, \quad (1)$$

and to evolve $\Gamma$ by propagating the embedding function $\phi$ according to an appropriate partial differential equation. The first applications of this level set formalism for the purpose of image segmentation were proposed in V. Caselles, F. Cattée, T. Coll, and F. Dibos. A geometric model for active contours in image processing. *Numer. Math.*, 66:1-31, 1993, R. Malladi, J. A. Sethian, and B. C. Vemuri. A topology independent shape modeling scheme. In *SPIE Conference on Geometric Methods in Computer Vision II*, volume 2031, pages 246-258, 1994 and S. Kichenassamy, A. Kumar, P. J. Giver, A. Tannenbaum, and A. J. Yezzi. Gradient flows and geometric active contour models. In *Proc. IEEE Intl. Conf. on Comp. Vis.*, pages 810-815, Boston, USA, 1995. Two key advantages over explicit interface propagation are the independence of a particular parameterization and the fact that the implicitly represented boundary Γ can undergo topological changes such as splitting or merging. This makes the framework well-suited for the segmentation of several objects or multiply—connected objects. One approach of including prior knowledge of shapes in level set object segmentation methods and imposing the prior knowledge in a stochastic fashion for detecting an object in an image has been described in United States Patent Application Publication number 2005/0169533 by Nikolaos Paragyios entitled: PRIOR KNOWLEDGE, LEVEL SET REPRESENTATION AND VISUAL GROUPING, which is herein incorporated by reference in its entirety. A brief description of the level set approach is provided next.

Segmentation in the present invention is preferably performed by level set methods using evolving interfaces (e.g., curves) according to a flow. The flow that governs the propagation of the curve may be recovered through the minimization of an objective function like an energy function. To introduce level set representations, consider a parametric curve that evolves according to a given motion equation in the normal direction of the curve (e.g., curvature). This flow may be implemented using a Lagrangian approach. The contour is represented in discrete form using a selection of control points. The curve position can be updated by solving equations that describe the curve and its motion for each control point. Such technique in the most general case cannot change the topology of the evolving curve and a re-parameterization of the evolving curve may be needed. The level set method was initially introduced in the area of fluid dynamics and is an emerging technique to cope with various applications in imaging, vision and graphics. Level set methods represent the evolving curve with the zero-level of a surface. Such a representation is implicit, intrinsic and parameter free. Shape-driven knowledge-based segmentation methods aim to recover a structure that has consistent geometric form when compared to a prior model. Modeling of the prior is needed as introducing global shape-driven constraints. This is equivalent with extracting a representation for the structure of interest from a set of training examples. The selection of representation is related to the form of prior that is to be introduced. The modeling is an important aspect of shape-driven segmentation techniques. According to an embodiment of the present disclosure, a formulation is implemented to account for prior knowledge in a level set method for shape-driven knowledge-based object extraction. Objects are represented using a stochastic distance function. Constraints on the segmentation process are imposed in a Bayesian fashion to seek for a geometric structure in the image plane that belongs to the family of shapes generated by the prior model.

Figure 1:
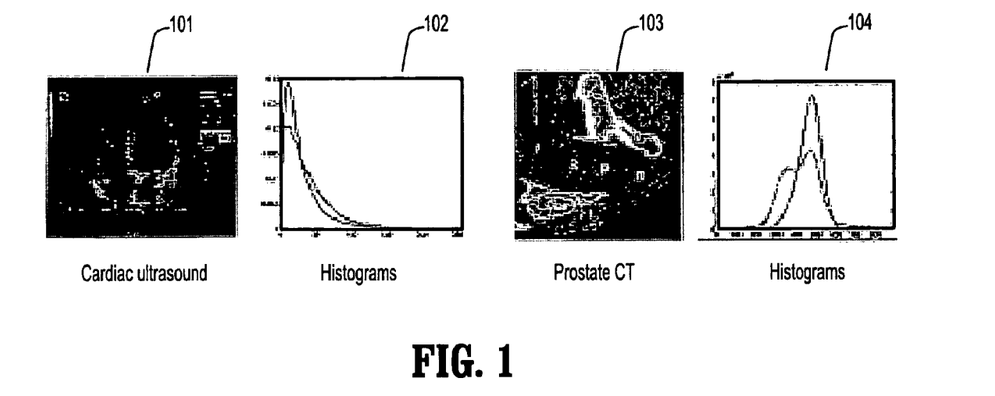
FIG. 1 shows medical images with related intensity diagrams.

When segmenting medical images, one commonly has to deal with noise, missing or misleading image information. For certain imaging modalities such as ultrasound or CT, the structures of interest do not differ much from their background in terms of their intensity distribution. An illustrative example of this is shown in FIG. 1. Therefore objects can not be accurately segmented based on the image information alone. In recent years, researchers have therefore proposed to enhance the level set method with statistical shape priors. Given a set of training shapes, one can impose information about which segmentations are a priori more or less likely. Such prior shape information was shown to drastically improve segmentation results in the presence of noise or occlusion. See, for example, the following publications: M. Leventon, W. Crimson, and O. Faugeras. Statistical shape influence in geodesic active contours. In *CVPR*, volume 1, pages 316-323, Hilton Head Island, S.C., 2000; A. Tsai, A. J. Yezzi;, and A. S. Willsky. A shape-based approach to the segmentation of medical imagery using level sets. *IEEE Trans. on Medical Imaging,* 22(2):137-154, 2003; D. Cremers, S. J. Osher, and S. Soatto. Kernel density estimation and intrinsic alignment for knowledge-driven segmentation: Teaching level sets to walk. In *Pattern Recognition*, volume 3175 of *LNCS*, pages 36-44. Springer, 2004; Rousson, N. Paragios, and R. Deriche. Implicit active shape models for 3d segmentation in MRI imaging. In *MICCAI*, pages 209-216, 2004; E. B. Dam, F. T. Fletcher, S. Pizer, C. Tracton, and J. Rosenman. Prostate shape modeling based on principal geodesic analysis bootstrapping. In *MICCAI*, volume 2217 of *LNCS*, pages 1008-1016, September 2004.; and D. Freedman, R. J. Radke, T. Zhang, Y. Jeong, D. M. Lovelock, and G. T. Chen. Model-based segmentation of medical imagery by matching distributions. *IEEE Trans Med Imaging,* 24(3):281-292, Mar. 2005. Most of these approaches are based on the assumption that the training shapes, encoded by their signed distance function, form a Gaussian distribution. This has two drawbacks: Firstly, the space of signed distance functions is not a linear space, therefore, the mean shape and linear combinations of eigenmodes are typically no longer signed distance functions. Secondly, even if the space were a linear space, it is not clear why the given set of sample shapes should be distributed according to a Gaussian density. In fact, as will be demonstrated as one aspect of the present invention, they are generally not Gaussian distributed. Recently, it was proposed to use nonparametric density estimation in the space of level set functions [3] in order to model nonlinear distributions of training shapes. (The term nonlinear refers to the fact that the manifold of permissible shapes is not merely a linear subspace). While this resolves the above drawbacks, one sacrifices the efficiency of working in a low-dimensional subspace (formed by the first few eigenmodes) to a problem of infinite-dimensional optimization.

Image 101 in FIG. 1 shows a cardiac ultrasound image. Image 102 shows the histograms corresponding to the empirical probability of intensities inside and outside the left ventricle. Image 103 shows a Prostate CT and 104 shows the histograms corresponding to the empirical probability of intensities inside and outside the prostate. The region-based segmentation of these structures is a challenging problem, because objects and background have similar histograms.

In the present invention, a framework for knowledge-driven segmentation methods and systems are provided. The framework, in accordance with one aspect of the present invention is based on the level set method. The framework, in accordance with other aspects of the present invention, integrates three contributions: Firstly, it provides a statistical shape prior which combines the efficiency of low-dimensional PCA-based methods with the accuracy of nonparametric statistical shape models. The key aspect is to perform kernel density estimation in a linear subspace which is sufficiently large to embed all training data. Secondly, a method is provided to estimate pose and translation parameters in a more data-driven manner. Thirdly, the intensity information in the image is optimally exploited by using probabilistic intensity models given by kernel density estimates of previously observed intensity distributions. Illustrative examples will be provided that will demonstrate effective segmentation of objects by the methods provided in the present invention.

Level Set Segmentation as Bayesian Inference

The goal of level set segmentation can be formulated as the estimation of the optimal embedding function: $\phi:\Omega\to R$ given an image $I:\Omega\to R$. In the Bayesian framework, this can be computed by maximizing the posterior distribution $$P(\phi|I) \propto P(I|\phi)P(\phi) \quad (2)$$

The maximization of (2) results in a problem of infinite-dimensional optimization. Given a set of training shapes encoded by their signed distance functions $\{\phi_i\}_{i=1\ldots N}$, Tsai et al. proposed to reduce the segmentation problem to one of finite-dimensional optimization by constraining the optimization problem to the finite-dimensional subspace spanned by the training shapes. See, A. Tsai, A. J. Yezzi, and A. S. Willsky. A shape-based approach to the segmentation of medical imagery using level sets. *IEEE Trans. on Medical Imaging*, 22(2):137-154, 2003.

In the present invention, this compact representation of the embedding function is useful. Given the distance d on the space of signed distance functions defined by: $d^2(\phi_1,\phi_2) = \int_{106} ((\phi_1(x)-\phi_2(x))^2 dx$, the present invention aligns the set of training shapes with respect to translation and rotation. Subsequently, it constrains the level set function $\phi$ to a parametric representation of the form:

$$\phi_{\alpha,h,\theta}(x) = \phi_0(R_\theta x + h) + \sum_{i=1}^{n} \alpha_i \psi_i(R_\theta x + h) \quad (3)$$

where $$\phi_0(x) = \frac{1}{N}\sum_{i=1}^{N} \phi_i(x)$$

represents the mean shape, $\{\psi_i(x)\}_{i=1\ldots n}$ are the eigenmodes of the distribution, and n<N is the dimension of the subspace spanned by the N training shapes. The parameter vector $\alpha=(\alpha_1,\ldots,\alpha_n)$ models shape deformations; while the parameters $h \in R^3$ and $\theta \in [0,2\pi]^3$ model translation and rotation of the respective shape. The estimation of the priors or training objects is made in a subspace which means that the full space that the priors occupy is not used in the steps in accordance aspect of the present invention. The subspace is spanned by n dimensions which is less than the N dimensions of the full space.

The infinite-dimensional Bayesian inference problem in (2) is therefore reduced to a finite-dimensional one where the conditional probability $$P(\alpha,h,\theta|I) \propto P(I|\alpha,h,\theta)P(\alpha,h,\theta) \quad (4)$$

is optimized with respect to the shape parameters $\alpha$, and the transformation parameters h and $\theta$. In the following, a uniform prior on these transformation parameters is assumed, i.e. $P(\alpha,h,\theta)=P(\alpha)$. In the next section, three solutions are presented as an aspect of the present invention to model this shape prior.

An efficient nonparametric statistical shape model.

Given a set of aligned training shapes $\{\phi_i\}_{i=1\ldots N}$, each of them can be represented by their corresponding shape vector $\{\alpha_i\}_{i=1\ldots N}$. In this notation, the goal of statistical shape learning is to infer a statistical distribution $P(\alpha)$ from these sample shapes. Two solutions which have been proposed are based on the assumptions that the training shapes can be approximated by a uniform distribution [15,13]: $P(\alpha)$=const., or by a Gaussian distribution (see, M. Leventon, W. Crimson, and 0. Faugeras. Statistical shape influence in geodesic active contours. In *CVPR*, volume 1, pages 316-323, Hilton Head Island, SC, 2000.):

$$P(\alpha) \propto \exp\left(-\alpha^T \sum\nolimits^{-1} \alpha\right), \text{ where } \sum = \frac{1}{N}\sum_i \alpha_i \alpha_i^T. \quad (5)$$

In the present invention, nonparametric density estimation is used to approximate the shape distribution within the linear subspace. See, F. Rosenblatt. Remarks on some nonparametric estimates of a density function. *Annals of Mathematical Statistics*, 27:832-837, 1956. The present invention models the shape distribution by the kernel density estimate:

$$P(\alpha) = \frac{1}{N\sigma}\sum_{i=1}^{N} K\left(\frac{\alpha-\alpha_i}{\sigma}\right), \text{ where } K(u) = \frac{1}{\sqrt{2\pi}}\exp\left(-\frac{u^2}{2}\right). \quad (6)$$

There exist various methods to automatically estimate appropriate values for the width $\sigma$ of the kernel function, ranging from k-th nearest neighbor estimates to cross-validation and bootstrapping. In accordance with one aspect of the present invention, simply set $\sigma$ to be the average nearest neighbor distance:

$$\sigma^2 = \frac{1}{N}\sum_{i=1}^{N} \min_{j\neq i} |\alpha_i - \alpha_j|^2.$$

Figure 3:
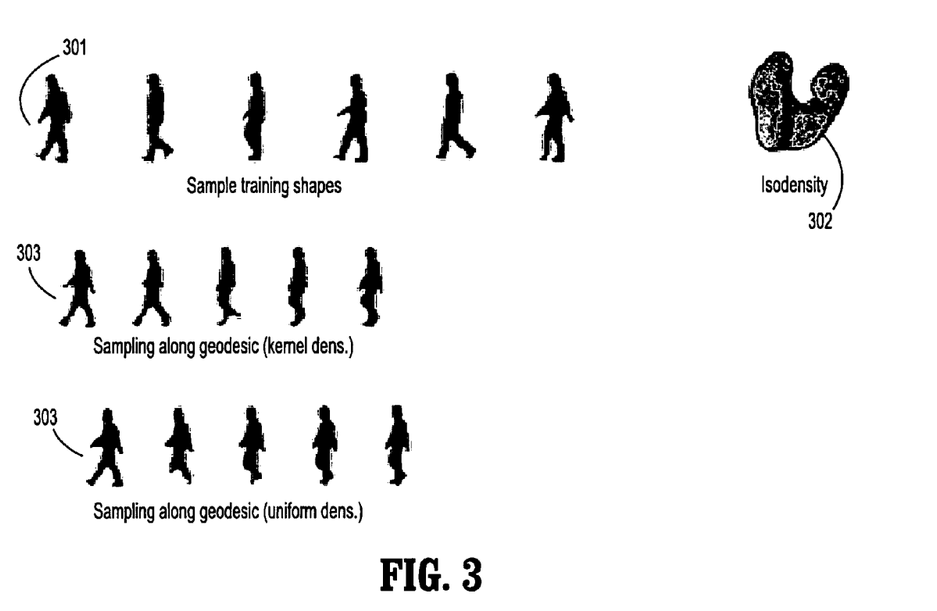
FIG. 3 shows the effects of linear versus nonlinear shape interpolation.

In the context of level set based image segmentation, the kernel density estimator (6) has two advantages over the uniform and Gaussian distributions:

The assumptions of uniform distribution or Gaussian distribution are generally not fulfilled. In FIG. 3, this is demonstrated for a set of silhouettes of sample shapes. The kernel density estimator, on the other hand, is known to approximate arbitrary distributions. Under mild assumptions, it was shown to converge to the true distribution in the limit of infinite sample size. (See, B. W. Silverman. *Density estimation for statistics and data analysis.* Chapman and Hall, London, 1992.)

The space of signed distance functions is known to not be a linear space. Therefore, neither the mean shape $\phi_0$ nor a linear combination of eigenmodes as in (3) will in general be a signed distance function. As a consequence, the functions $\phi(x)$ favored by the uniform or the Gaussian distribution cannot be expected to be signed distance functions. The kernel density estimator (6), on the other hand, favors shape vectors $\alpha$ which are in the vicinity of the sample shape vectors $\alpha_i$. By construction, these vectors correspond to signed distance functions. In fact: In the limit of infinite sample size, the distribution inferred by the kernel density estimator (6) converges towards a distribution on the manifold of signed distance functions.

Figure 2:
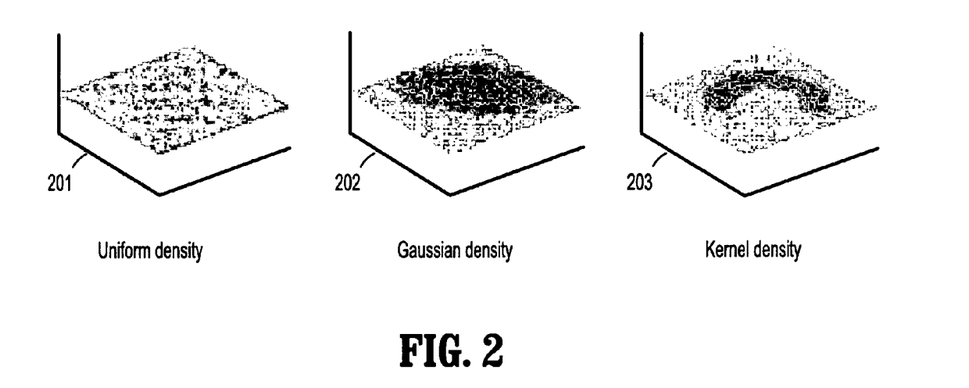
FIG. 2 shows different density diagrams.

FIG. 2 shows schematic plots of the three methods for a set of sample data spanning a two-dimensional subspace in $R^3$.

The kernel density estimator clearly captures the distribution most accurately. Darker shading indicates areas of high probability density for the respective models. The kernel density estimator adapts to the training data more flexibly since it does not rely on specific assumptions about the shape of the distribution. In FIG. 2, image 201 shows a density estimate plot of a uniform density, image 202 of a Gaussian density and image 203 of a Kernel density. FIG. 3 shows a 3D projection of the estimated shape density computed for a set of silhouettes of a walking person. Images 303 and 304 show shape morphing by sampling along geodesics of the uniform density in 303 and the kernel density in 304. These indicate that the kernel estimator captures the distribution of valid shapes more accurately. FIG. 3 image 301 shows 6 out of 49 training shapes. FIG. 3 image 302 shows a 3D projection of the isosurface of the estimated (48-dimensional) shape distribution. The latter is clearly neither uniform nor Gaussian. FIG. 3 image 303 and 304 show a morphing between two sample shapes along geodesics induced by a uniform distribution in image 303 and a kernel distribution in image 304. The uniform distribution induces a morphing where legs disappear and reappear and where the arm motion is not captured. The nonlinear sampling provides more realistic intermediate shapes. Human silhouettes are chosen because they exhibit more pronounced shape variability than most medical structures analyzed.

In analogy to the shape learning, the kernel density estimation to learn the conditional probability for the intensity function I in (4) is used from examples. A similar precomputation of intensity distributions by means of mixture models was proposed in N. Paragios and R. Deriche. Geodesic active regions and level set methods for supervised texture segmentation. *Int. J. of Computer Vision*, 46(3):223-247, 2002. Given a set of presegmented training images, the kernel density estimate of the intensity distributions $P_{in}$ and $P_{out}$ of object and background are given by the corresponding smoothed intensity histograms. This has two advantages: Firstly, the kernel density estimator does not rely on specific assumptions about the shape of the distribution. FIG. 1 shows that the intensity distributions for ultrasound and CT images are not well approximated by Gaussian or Laplacian models. Secondly, in contrast to the joint estimation of intensity distributions [2], this simplifies the segmentation process which no longer requires an updating of intensity models. Moreover, we found the segmentation process to be more robust to initialization in numerous experiments.

Energy Formulation and Minimization

Maximizing the posterior probability in (2), or equivalently minimizing its negative logarithm, will generate the most probable segmentation of a given image. With the nonparametric models for shape and intensity introduced above, this leads to an energy of the form $$E(\alpha, h, \theta) = -\log P(I|\alpha, h, \theta) - \log P(\alpha), \quad (7)$$

The nonparametric intensity model permits to express the first term and equation (6) gives exactly the second one. With the Heaviside step function H and the short hand $H_{100} = H(\phi_{\alpha, h, \theta}(X))$, we end up with:

$$E(\alpha, h, \theta) = -\int_\Omega (H_\phi \log p_{in}(I) + (1 - H_\phi) \log p_{out}(I)) dx - \log\left(\frac{1}{N\sigma} \sum_{i=1}^{N} K\left(\frac{\alpha - \alpha_i}{\sigma}\right)\right).$$

With $$e(x) = \left[\log \frac{p_{out}(I(x))}{p_{in}(I(x))}\right], \; K_i = K\left(\frac{\alpha - \alpha_i}{\sigma}\right) \text{ and } \psi = (\psi_1, \ldots, \psi_n),$$

we obtain the following system of coupled gradient descent equations:

$$\begin{cases} \frac{d\alpha}{dt} = \int_\Omega \delta(\phi_{\alpha,h,\theta}(x)) \psi(R_\theta x + h) e(x) \, dx + \frac{1}{\sigma^2} \frac{\sum_{i=1}^{N}(\alpha - \alpha_i) K_i}{\sum_{i=1}^{N} K_i}, \\ \frac{dh}{dt} = \int_\Omega \delta(\phi_{\alpha,h,\theta}(x)) \nabla \phi_{\alpha,h,\theta}(x) e(x) \, dx, \\ \frac{d\theta}{dt} = \int_\Omega \delta(\phi_{\alpha,h,\theta}(x)) (\nabla \phi_{\alpha,h,\theta}(x) \cdot \nabla_\theta Rx) e(x) dx. \end{cases} \quad (8)$$

In all equations, the Dirac delta function $\delta$ appears as factor inside the integrals over the image domain $\Omega$. This allows to restrict all computations to a narrow band around the zero crossing of $\phi$. While the evolution of translation and pose parameters h and $\theta$ are merely driven by the data term e(x), the shape vector $\alpha$ is additionally drawn towards each training shape with a strength that decays exponentially with the distance to the respective shape.

Experimental Results and Validation

The methods of the present invention have been applied to the segmentation of different objects in medical images which will serve to illustrate and validate the methods of the present invention. The illustrative examples pertain to heart segmentation from ultrasound images and prostate segmentation from 3D CT images.

Heart Segmentation from Ultrasound Images

Figure 4:
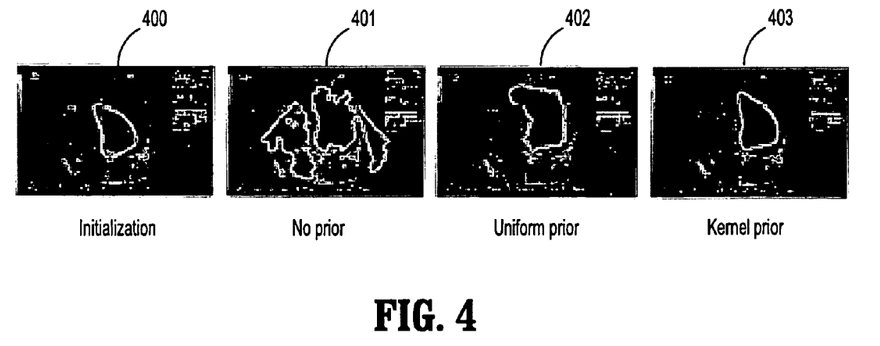
FIG. 4 shows the effect of different prior models.

FIG. 4 shows experimental results obtained for the segmentation of the left ventricle in 2D cardiac ultrasound sequences, using shape priors constructed from a set of 21 manually segmented training images. In contrast to the segmentation with uniform prior (images 402 in FIG. 4), the nonparametric statistical shape prior allows to accurately constrain the segmentation (image 403 of FIG. 4). This becomes particularly apparent in areas where the data term is too weak. As a quantitative evaluation we computed the percentage of correctly classified object pixels and that of misclassified ones. During energy minimization, the percentage of correctly classified pixels increases from 56% to 90% while the percentage of false positives decreases from 27% to 2.7% by using the kernel prior. Using the uniform prior, we attain 92% correctly classified, yet the percentage of false positives increases to 42%. Merely constraining the boundary evolution to the linear subspace spanned by the training shapes is insufficient to provide for accurate segmentation results.

Prostate Segmentation from 3D CT Images.

Figure 5:
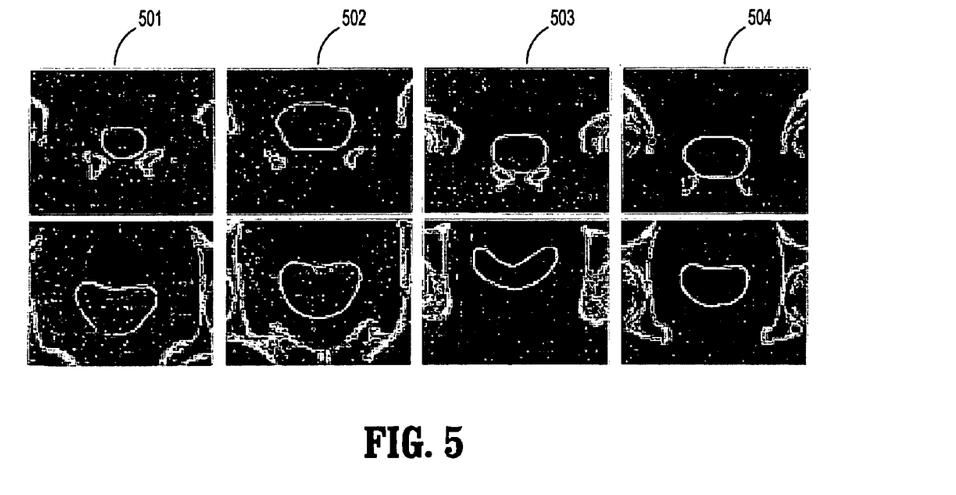
FIG. 5 shows images of object segmentation.
Figure 6:
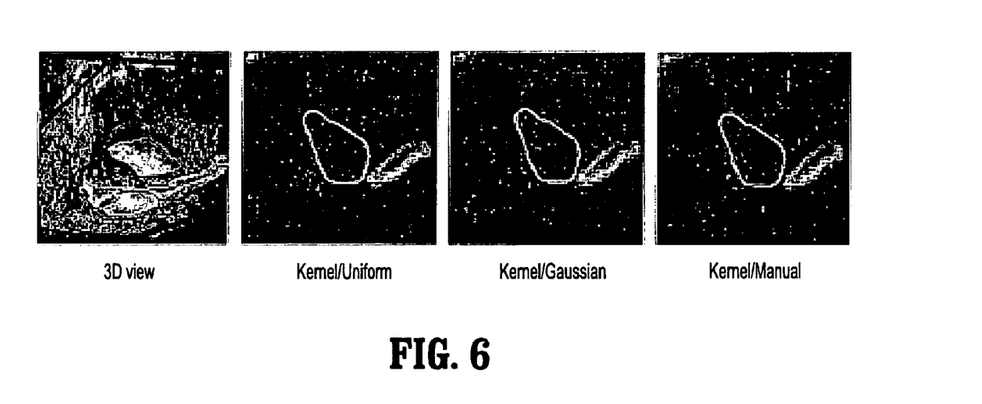
FIG. 6 shows additional images of object segmentation.

As another illustrative example, a nonparametric 3D shape model of the prostate using 12 manually extracted prostate images (with seminal vesicles) collected from two different patients was developed. FIG. 5 shows the prostate segmentation for 2 patients with the same shape model. Each of the columns with two images 501, 502, 503 and 504 column shows coronal and axial slices of the same segmentation, for the first patient (left two columns 501 and 502) and the second one (last two columns 503 and 504). The first column 501 also shows the manual segmentation (black contour). In contrast to existing work, we subsequently used a single shape model for the segmentation of images from different patients. We employed a leave-one-out strategy by removing the image of interest from the training phase. FIG. 6 shows 2D cuts of a few results obtained using this strategy. It shows the segmentations obtained with the kernel prior (white line) and with alternative approaches (black line). With a one-click initialization inside the organ, methods of the present invention lead to a steady-state solution in less than 20 seconds. We obtained 86% successfully classified organ voxels and 11% mis-classified organ voxels. This compares favorably to the intra-patients results reported in D. Freedman, R. J. Radke, T. Zhang, Y. Jeong, D. M. Lovelock, and G. T. Chen. Model-based segmentation of medical imagery by matching distributions. *IEEE Trans Med Imaging*, 24(3):281-292, Mar. 2005.

FIG. 5 provides qualitative comparisons to the manual segmentation, as well as to the segmentations obtained with uniform and Gaussian approximations of the shape distribution.

Methods were presented for creating and applying an efficient and accurate statistical shape prior for level set segmentation which is based on nonparametric density estimation in the linear subspace spanned by a set of training data. In addition, the presented segmentation methods which are aspects of the present invention exploit nonparametric estimates of intensity distributions and efficient optimization of pose and translation parameters. Illustrative quantitative evaluation of segmentation accuracy and speed for cardiac ultrasound images and for 3D CT images of the prostate which validated the methods here are presented. The presented examples indicate that the proposed nonparametric shape prior outperforms previously proposed shape priors for level set segmentation.

Figure 7:
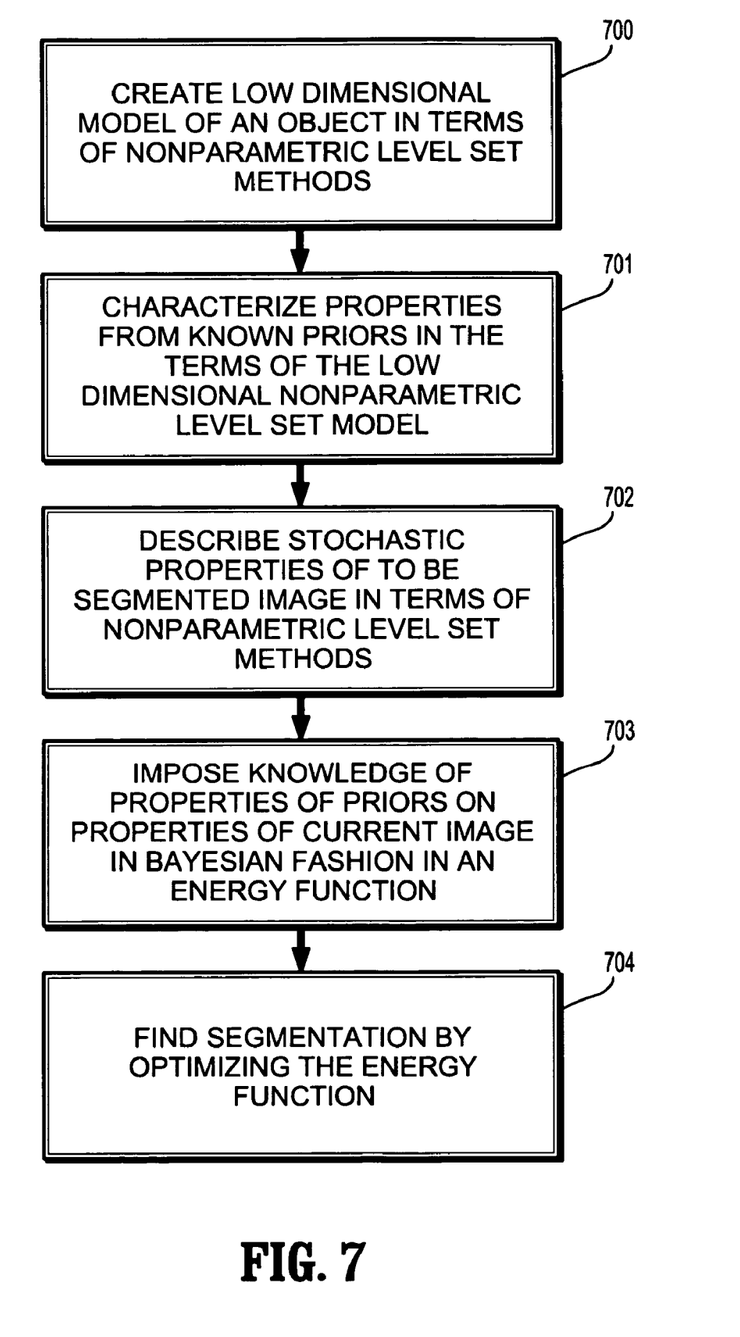
FIG. 7 illustrates the method of the present invention in accordance with one aspect of the present invention.

FIG. 7 illustrates a summary of an aspect of the present invention. The first step 701 in the segmentation process is to create a nonparametric model that allows describing an image in the terms of level set methods. A model used in the present invention is the kernel density estimate as a nonparametric approximation of the shape distribution. The next step 702 involves the learning of the shapes of a set of priors. Herein the kernel density estimates of the presegmented training images are provided by smoothed intensity histograms. In step 703 the kernel density estimate of the to be segmented image is created. In step 704 an Energy function E($\alpha$, h, $\theta$) is provided that can be expressed in a Bayesian fashion as E($\alpha$, h, $\theta$)=–logP(I|$\alpha$, h, $\theta$) –logP($\alpha$). The most probable segmentation (looking like the priors) will be obtained by maximizing the posterior probability of minimizing the energy expression, which is provided in step 704.

Figure 8:
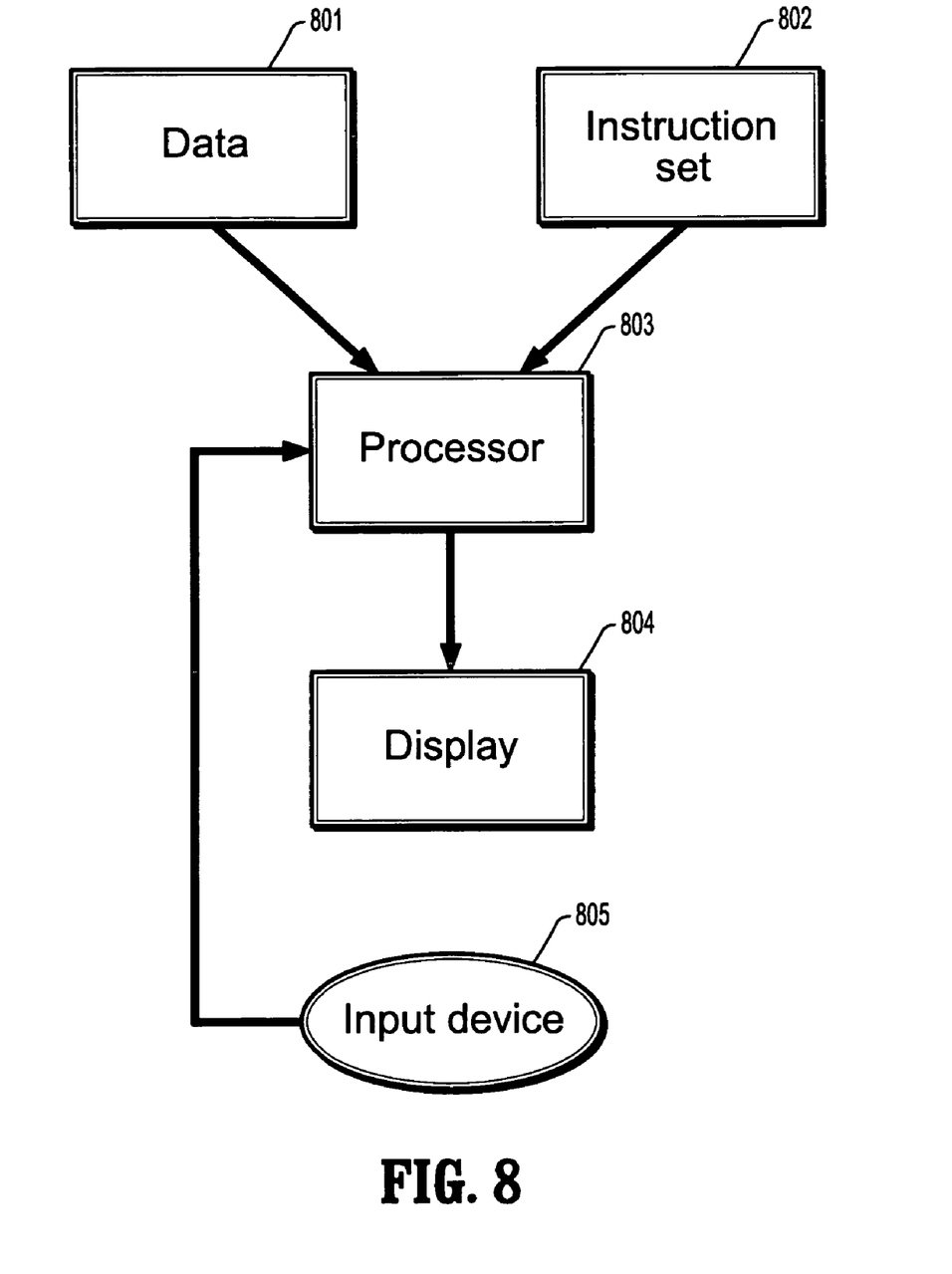
FIG. 8 shows a diagram of an image segmentation system.

The segmentation methods that are part of the present invention can be executed by a system as shown in FIG. 8. The system is provided with data 801 representing the to be segmented image as well as the prior images. An instruction set or program 802 executing the methods of learning and segmentation using the methods of the present invention is provided and combined with the data in a processor 803, which can process the instructions of 802 applied to the data 801 and show the segmented image on a display 804. The processor can be dedicated hardware, a GPU, a CPU or any other computing device that can execute the instructions of 802. An input device 805 like a mouse, or track-ball or other input device allows a user to select the initial object and to start the segmentation process. Consequently the system as shown in FIG. 8 provides an interactive system for object segmentation from an image using level set methods and shape and intensity priors.

The following references provide background information generally related to the present invention and are hereby incorporated by reference: [1] V. Caselles, F. Catté, T. Coll, and F. Dibos. A geometric model for active contours in image processing. *Numer. Math.*, 66:1-31, 1993; [2] T. F. Chan and L. A. Vese. Active contours without edges. *IEEE Trans. Image Processing*, 10(2):266-277, 2001; [3] D. Cremers, S. J. Osher, and S. Soatto. Kernel density estimation and intrinsic alignment for knowledge-driven segmentation: Teaching level sets to walk. In *Pattern Recognition*, volume 3175 of *LNCS*, pages 36-44. Springer, 2004; [4] E. B. Dam, F. T. Fletcher, S. Pizer, C. Tracton, and J. Rosenman. Prostate shape modeling based on principal geodesic analysis bootstrapping. In *MICCA*, volume 2217 of *LNCS*, pages 1008-1016, September 2004; [5] A. Dervieux and F. Thomasset. A finite element method for the simulation of Raleigh-Taylor instability. *Springer Lect. Notes in Math.*, 771:145-158, 1979; [6] D. Freedman, R. J. Radke, T. Zhang, Y. Jeong, D. M. Lovelock, and G. T. Chen. Model-based segmentation of medical imagery by matching distributions. *IEEE Trans Med Imaging*, 24(3):281-292, March 2005; [7] S. Kichenassamy, A. Kumar, P. J. Giver, A. Tannenbaum, and A. J. Yezzi. Gradient flows and geometric active contour models. In *Proc. IEEE Intl. Conf on Comp. Vis.*, pages 810-815, Boston, USA, 1995; [8] M. Leventon, W. Crimson, and O. Faugeras. Statistical shape influence in geodesic active contours. In *CVPR*, volume 1, pages 316-323, Hilton Head Island, S.C., 2000; [9] R. Malladi, J. A. Sethian, and B. C. Vemuri. A topology independent shape modeling scheme. In *SPIE Conference on Geometric Methods in Computer Vision II*, volume 2031, pages 246-258, 1994; [10] 5. J. Osher and J. A. Sethian. Fronts propagation with curvature dependent speed: Algorithms based on Hamilton—Jacobi formulations. *J. of Comp. Phys.*, 79:12-49, 1988; [11] N. Paragios and R. Deriche. Geodesic active regions and level set methods for supervised texture segmentation. *Int. J. of Computer Vision*, 46(3):223-247, 2002; [12] F. Rosenblatt. Remarks on some nonparametric estimates of a density function. *Annals of Mathematical Statistics*, 27:832-837, 1956; [13] M. Rousson, N. Paragios, and R. Deriche. Implicit active shape models for 3d segmentation in MRI imaging. In *MICCAI*, pages 209-216, 2004; [14] B. W. Silverman. *Density estimation for statistics and data analysis*. Chapman and Hall, London, 1992; [15] A. Tsai, A. J. Yezzi, and A. S. Willsky. A shape-based approach to the segmentation of medical imagery using level sets. *IEEE Trans. on Medical Imaging*, 22(2):137-154, 2003.

Any reference to the term pixel herein shall also be deemed a reference to a voxel.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

We claim:

1. A method of segmenting an object in a set of image data using one or more prior instances of the object, comprising:

determining a nonparametric estimate of a statistical shape distribution from the one or more prior instances of the object in a subspace spanned by the one or more prior instances of the object by a kernel density estimator;

determining a nonparametric estimate of a statistical intensity distribution from one or more prior instances of the object by a kernel density estimator;

combining the kernel density estimator of the statistical shape distribution with the kernel density estimator of the statistical intensity distribution in a Bayesian expression conditioned on the set of image data, wherein the expression is provided in accordance with:

$$E(\alpha, h, \theta) = -\int_{\Omega} (H_\phi \log p_{in}(I) + (1 - H_\phi) \log p_{out}(I)) \, dx - \log\left(\frac{1}{N\sigma} \sum_{i=1}^{N} K\left(\frac{\alpha - \alpha_i}{\sigma}\right)\right);$$

selecting a segmentation of the object in the set of image data by executing a level set method by a processor which optimizes the Bayesian expression; and the processor generating an image of the segmented object on a display.

2. The method of claim 1, wherein a shape vector of the one or more prior instances of the object is based on an average value of a shape vector associated with each of the one or more prior instances of the object.

3. The method of claim 1, wherein a shape vector of the one or more prior instances of the object corresponds to a signed distance function.

4. The method of claim 1, wherein the expression is an energy function.

5. The method of claim 1, wherein the statistical shape distribution is translation and rotation invariant.

6. The method of claim 1, wherein the kernel density estimator related to the nonparametric estimate of the statistical intensity distribution is a smoothed intensity histogram.

7. The method as claimed in claim 1, wherein the set of image data is ultra-sound image data.

8. The method as claimed in claim 1, wherein the set of image data is CT image data.

9. The method as claimed in claim 1, wherein the object is a prostate.

10. A system for segmenting an object in a set of image data using one or more prior instances of the object, comprising:

a processor;

computer software operable on the processor, the computer software being capable of:

determining a nonparametric estimate of a statistical shape distribution from the one or more prior instances of the object in a subspace spanned by the one or more prior instances of the object by a kernel density estimator;

determining a nonparametric estimate of a statistical intensity distribution from the one or more prior instances of the object by a kernel density estimator;

combining the kernel density estimator of the statistical shape distribution with the kernel density estimator of the statistical intensity distribution in a Bayesian expression conditioned on the set of image data, wherein the expression is provided in accordance with:

$$E(\alpha, h, \theta) = -\int_{\Omega} (H_\phi \log p_{in}(I) + (1 - H_\phi) \log p_{out}(I)) \, dx - \log\left(\frac{1}{N\sigma} \sum_{i=1}^{N} K\left(\frac{\alpha - \alpha_i}{\sigma}\right)\right);$$

and selecting a segmentation of the object in the set of image data by executing a level set method which optimizes the Bayesian expression.

11. The system of claim 10, wherein a shape vector of the one or more prior instances of the object is based on an average value of a shape vector associated with each of the one or more prior instances of the object.

12. The system of claim 10, wherein a shape vector of the one or more prior instances of the object corresponds to a signed distance function.

13. The system of claim 10, wherein the expression is an energy function.

14. The system of claim 10, wherein the statistical shape distribution is translation and rotation invariant.

15. The system of claim 10, wherein the kernel density estimator related to the nonparametric estimate of the statistical intensity distribution is a smoothed intensity histogram.

16. The system as claimed in claim 10, wherein the set of image data is ultra-sound image data.

17. The system as claimed in claim 10, wherein the set of image data is CT image data.

18. The system as claimed in claim 10, wherein the object is a prostate.

19. The system as claimed in claim 10, wherein the set of image data is image data of a heart.

20. A system for segmenting an object in a set of image data using one or more prior instances of the object, comprising:

a processor;

computer software operable on the processor, the computer software being capable of:

determining a nonparametric estimate of a statistical shape distribution from the one or more prior instances of the object in a subspace spanned by the one or more prior instances of the object;

imposing the nonparametric estimate of the statistical shape distribution in a Bayesian expression conditioned on the set of image data, wherein the expression is provided as an energy expression in accordance with:

$$E(\alpha, h, \theta) = -\int_{\Omega} (H_\phi \log p_{in}(I) + (1 - H_\phi) \log p_{out}(I)) \, dx - \log\left(\frac{1}{N\sigma} \sum_{i=1}^{N} K\left(\frac{\alpha - \alpha_i}{\sigma}\right)\right);$$

and selecting a segmentation of the object in the set of image data by executing a level set method which optimizes the Bayesian expression.

* * * * *